US009367777B2

(12) United States Patent
Matsuda

(10) Patent No.: US 9,367,777 B2
(45) Date of Patent: Jun. 14, 2016

(54) COMMUNICATION SYSTEM, TERMINAL DEVICE, AND PERIPHERAL DEVICE FOR SETTING A VALUE OF THE PERIPHERAL DEVICE FROM THE TERMINAL DEVICE

(75) Inventor: Munehisa Matsuda, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 459 days.

(21) Appl. No.: 13/248,230

(22) Filed: Sep. 29, 2011

(65) Prior Publication Data

US 2012/0081735 A1    Apr. 5, 2012

(30) Foreign Application Priority Data

Sep. 30, 2010    (JP) .................................. 2010-221247

(51) Int. Cl.
| | |
|---|---|
| *G06F 3/048* | (2013.01) |
| *G06K 15/00* | (2006.01) |
| *G06F 3/12* | (2006.01) |
| *G06F 3/01* | (2006.01) |

(52) U.S. Cl.
CPC ............ *G06K 15/402* (2013.01); *G06F 3/1203* (2013.01); *G06F 3/1231* (2013.01); *G06F 3/1285* (2013.01); *G06K 15/002* (2013.01)

(58) Field of Classification Search
CPC .... G06F 9/4443; G06F 3/0481; G06F 3/1285
USPC ....................................................... 715/780
See application file for complete search history.

(56) References Cited

U.S. PATENT DOCUMENTS

| | | | | |
|---|---|---|---|---|
| 6,160,554 | A * | 12/2000 | Krause ......................... | 715/804 |
| 6,272,484 | B1 * | 8/2001 | Martin et al. | |
| 6,515,684 | B1 * | 2/2003 | Knodt ........................... | 715/777 |
| 7,103,849 | B2 * | 9/2006 | Aikawa ......................... | 715/777 |
| 7,117,255 | B1 | 10/2006 | Yamamoto et al. | |
| 7,346,855 | B2 * | 3/2008 | Hellyar et al. ................ | 715/783 |
| 7,587,679 | B1 * | 9/2009 | Sundermeyer et al. ....... | 715/777 |
| 7,673,255 | B2 * | 3/2010 | Schechter et al. ............ | 715/838 |
| 2001/0026288 | A1 * | 10/2001 | Shima ........................... | 345/764 |
| 2002/0054008 | A1 * | 5/2002 | Aikawa ......................... | 345/100 |
| 2003/0030664 | A1 * | 2/2003 | Parry ............................. | 345/744 |
| 2005/0210408 | A1 * | 9/2005 | Baranda ........................ | 715/810 |
| 2006/0074929 | A1 * | 4/2006 | Weber et al. .................. | 707/100 |
| 2006/0279780 | A1 * | 12/2006 | Anno et al. ................... | 358/1.15 |

FOREIGN PATENT DOCUMENTS

JP          2001-216262          8/2001

* cited by examiner

*Primary Examiner* — Nicholas Augustine

(74) *Attorney, Agent, or Firm* — Scully, Scott, Murphy & Presser, P.C.

(57) ABSTRACT

A peripheral device configured to be connected to a terminal device, may have a processor, and a memory storing computer readable instructions that, when executed, cause the peripheral device to configured to provide sections. The sections may include a first supply section configured for supplying setting screen data that includes a first set value field and a first cancel button configured for returning a second value in the first set value field to the first value, and a second supply section configured for supplying error screen data that includes a second set value field and a second cancel button configured to cause the setting screen to be displayed on the terminal device in which the first value is displayed in the first set value field instead of the second value.

7 Claims, 11 Drawing Sheets

COMMUNICATION SYSTEM, TERMINAL DEVICE, AND PERIPHERAL DEVICE FOR SETTING A VALUE OF THE PERIPHERAL DEVICE FROM THE TERMINAL DEVICE

BACKGROUND OF THE INVENTION

1. Field of the Invention

The present invention relates to a technique for changing various setting items of a device from a terminal device side.

2. Description of the Related Art

In the related art, devices that are connected directly to terminal devices via networks have been popularized. In such a device, a technique is used in which when various setting items of the device are changed from a terminal device side, setting screen data within the device is supplied to the terminal device. In the terminal device to which the setting screen data is supplied, a screen that includes a set value field in which contents of setting items can be inputted, a transmission button for transmitting a content inputted in the set value field to the device, and a cancel button for canceling a content inputted in the set value field, is displayed for prompting a user to perform an operation such as an input.

However, it is unclear what operation the cancellation in the above-described related art specifically indicates. In addition, there is a demand that it is desired to return to a content previously inputted in the set value field when the cancel button is pressed.

SUMMARY OF THE INVENTION

The present specification discloses a technique to return a content inputted in a set value field to a previously inputted content when a cancel button is pressed.

A peripheral device disclosed by the present specification is a device configured to be connected to a terminal device. The device includes: a processor, when executing computer readable instructions stored on a memory, configured to provide: a first supply section configured for supplying setting screen data representing a setting screen to be displayed on the terminal device that includes a first set value field in which a first value that is currently set in a setting item of the peripheral device is displayed so as to be changeable, a setting button for setting a second value displayed in the first set value field in the setting item, and a first cancel button configured for returning the second value in the first set value field to the first value; and a second supply section configured for supplying error screen data when the setting button is selected in the setting screen and it is determined that the second value is an inappropriate value, the error screen data representing an error screen to be displayed on the terminal device that includes a second set value field in which the second value is displayed, and a second cancel button configured to cause the setting screen to be displayed on the terminal device in which the first value is displayed in the first set value field instead of the second value.

The technique disclosed in the specification can be implemented in various forms such as a method for controlling a device, a program for implementing a function of a device, and a recording medium having the program recorded therein.

DESCRIPTION OF THE PREFERRED EMBODIMENTS

Embodiment 1

Embodiment 1 will be described with reference to FIGS. 1 to 7.

1. Configuration of System

Figure 1:
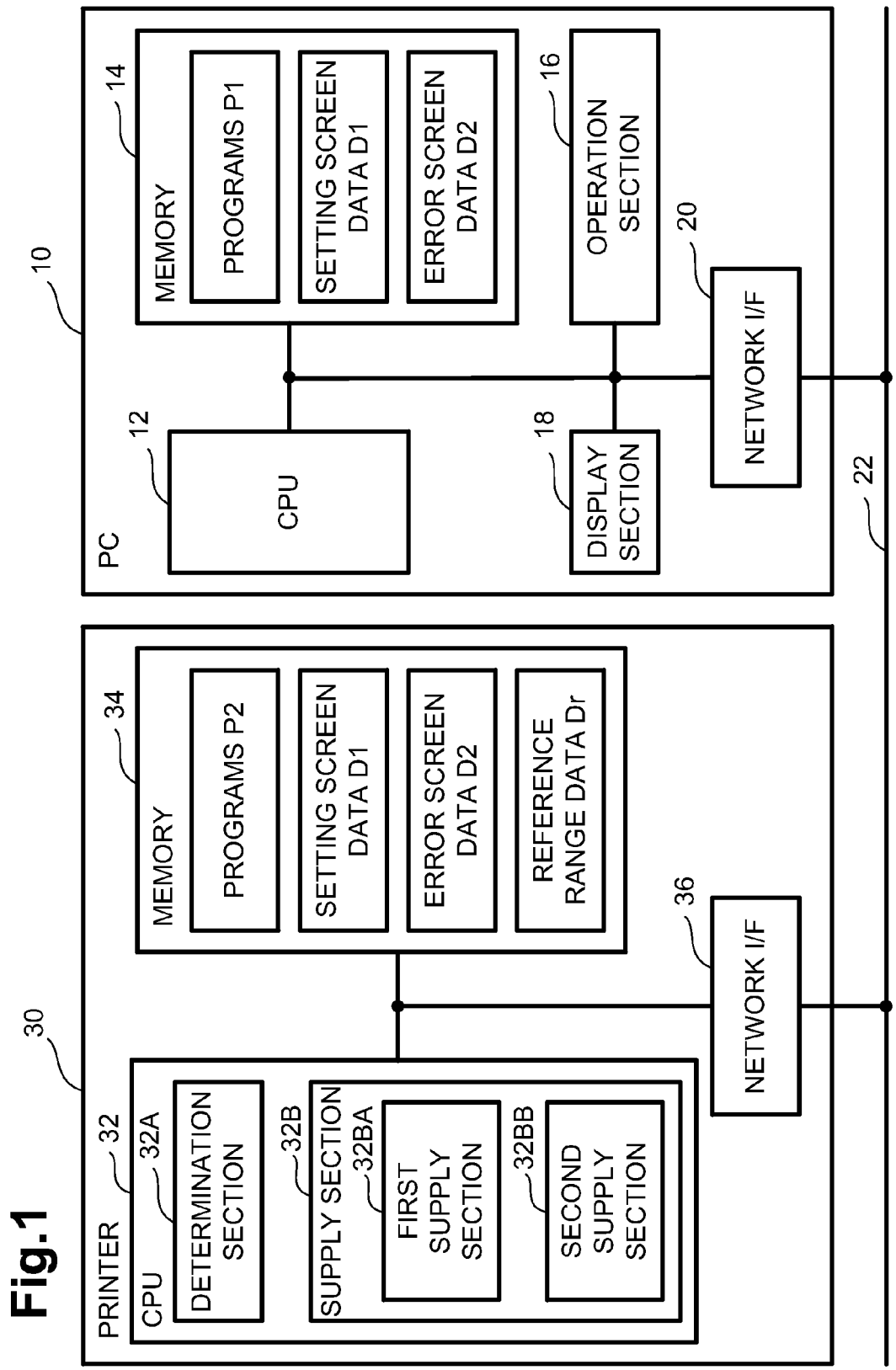
FIG. 1 is a block diagram illustrating a configuration of a system according to Embodiment 1.

FIG. 1 is a block diagram illustrating an exemplary configuration of a system of the embodiment. The system includes a personal computer (an example of a terminal device, hereinafter, referred to as "PC") 10 and a printer (an example of a device) 30.

The PC 10 includes a central processing unit (hereinafter, referred to as "CPU") 12, a memory (including computer readable storage devices such as a ROM, a RAM, a hard disk, and an optical disk) 14, an operation section 16 including a keyboard and a pointing device, a display section 18 including a display, and a network interface 20.

In the memory 14, a plurality of programs P1 is stored. In accordance with the programs P1 read from the memory 14, the CPU 12 controls the PC 10 and controls communication with the printer 30.

The network interface 20 is connected, for example, to a LAN (Local Area Network) by way of a communication line 22. The printer 30 is connected to the communication line 22, and the PC 10 can perform data communication with the printer 30 via the network interface 20. It should be noted that other than the connection via the communication line 22 by the LAN, for example, the PC 10 and the printer 30 may be connected directly to each other by using a dedicated wire or may be connected to each other by using wireless communication using wireless protocols such as IEEE 802.11, Bluetooth, and other known protocols.

Next, the printer 30 will be described. The printer 30 includes a CPU 32, a memory 34, and a network interface 36.

In the memory 34, a plurality of programs P2 is stored. In accordance with the programs P2 read from the memory 34, the CPU 32 controls the printer 30 and controls communication with the PC 10. The network interface 36 is connected to the same communication line as the communication line 22 to which the PC 10 is connected, and the printer 30 can perform data communication with the PC 10.

As shown in FIG. 1, reference range data Dr is stored in the memory 34. The reference range data Dr defines a range of value appropriate for a particular printer setting. As described below, when receiving a change value V2 from the PC 10 via the network interface 36, the CPU 32 serves as a determination section 32A to determine whether or not the change value V2 is included in the reference range data Dr. When the change value V2 is included in the reference range data Dr, the determination section 32A determines that the change value V2 is an appropriate value. When the change value V2 is not included in the reference range data Dr, the determination section 32A determines that the change value V2 is an inappropriate value.

Further, setting screen data D1 for representing a setting screen G1 on the display section 18 of the PC 10 and error screen data D2 for representing an error screen G2 on the display section 18 of the PC 10 are stored in the memory 34. When receiving an instruction from the PC 10, the CPU 32 serves as a supply section 32B to supply the screen data D (including setting screen data D1 and error screen data D2) to the PC 10 via the network interface 36. The supply section 32B includes a first supply section 32BA and a second supply section 32BB. The first supply section 32BA supplies the setting screen data D1, and the second supply section 32BB supplies the error screen data D2. In the memory 14 of the PC 10, for example, a web browser supporting the screen data D is installed as a program P1. When the screen data D is supplied, the CPU 12 of the PC 10 stores the screen data D in the memory 14, and displays these screens on the display section 18 of the PC 10 in accordance with the web browser.

(Setting Screen G1)

Figure 2:
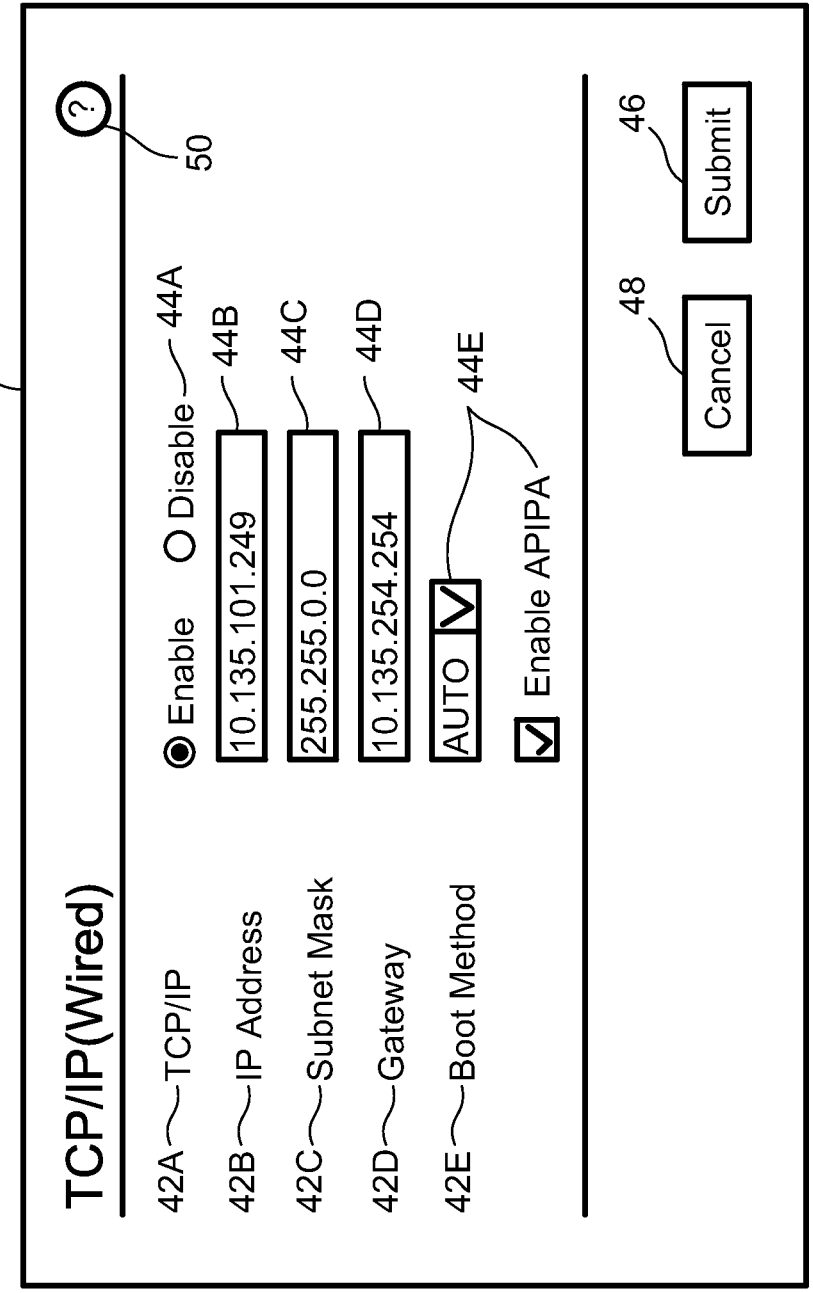
FIG. 2 is a diagram schematically illustrating a setting screen.

As shown in FIG. 2, the setting screen G1 is a screen for a user to set various setting items concerning the printer 30 such as communication settings and print settings, and is a screen displayed on the display section 18. FIG. 2 illustrates a setting screen for setting setting items concerning communication of the printer 30 such as TCP/IP (Transmission Control Protocol/Internet Protocol) and IP Address. The setting screen G1 includes a plurality of setting items 42A to 42E, a plurality of setting fields 44A to 44E, a setting button 46, a cancel button 48, and a help button 50.

The setting item 42 and the setting field 44 correspond to each other. In the setting field 44, a set value V1 (corresponding to a first value) of the corresponding setting item 42 is displayed so as to be changeable to a change value V2 (corresponding to a second value). Here, the set value V1 is a numerical value or the like of each setting item 42 that is currently set in the printer 30, and the change value V2 is a numerical value or the like that is newly inputted and displayed by the user in each setting item 42 instead of the set value V1.

The setting button 46 is a button for setting the change value V2 displayed in the setting field 44, to the printer 30. The cancel button 48 is a button for returning the change value V2 in the setting field 44 to the set value V1. The help button 50 is a button for displaying help information corresponding to each setting item 42. It should be noted that the help button 50 may not be included.

(Error Screen G2)

Figure 3:
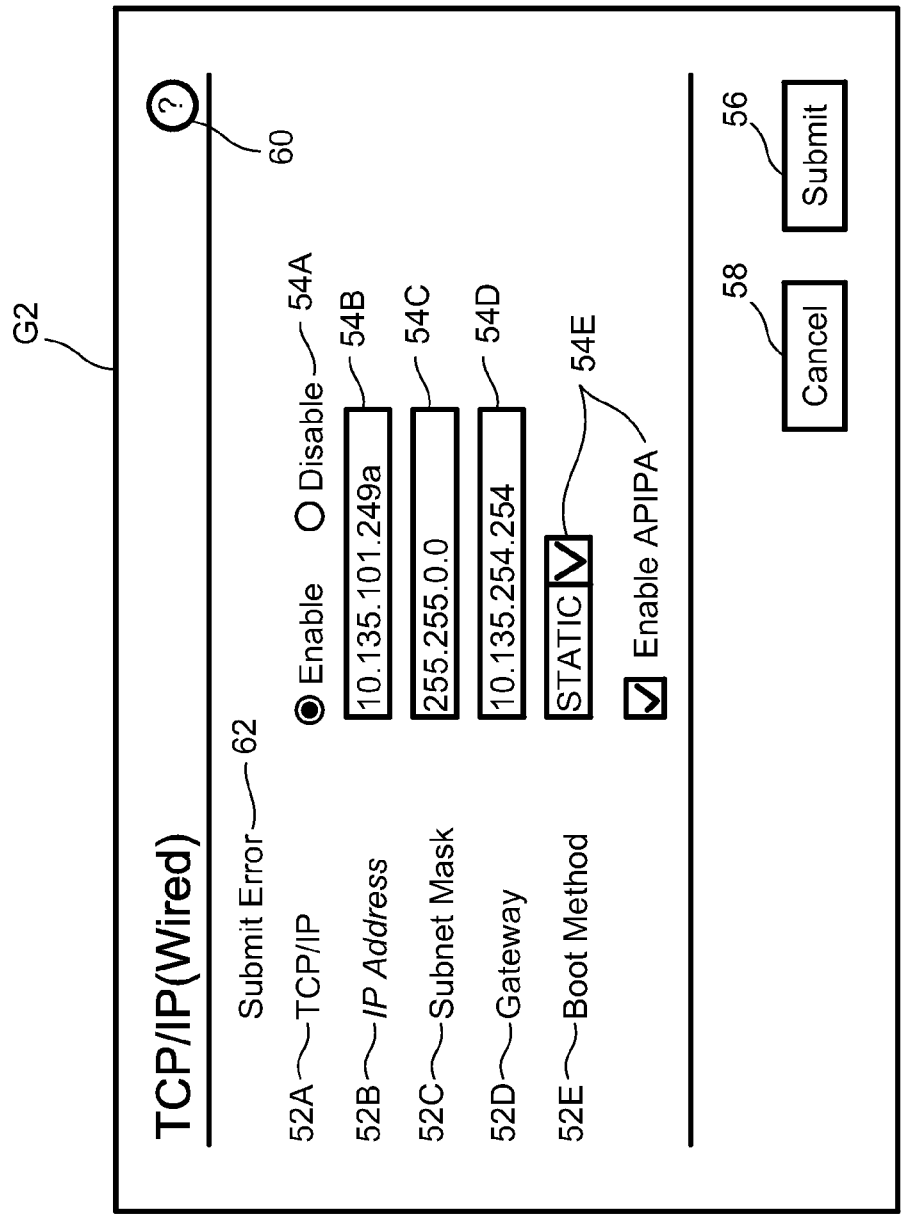
FIG. 3 is a diagram schematically illustrating an error screen.

As shown in FIG. 3, the error screen G2 is a screen for the PC 10 or the printer 30 to, when the setting button 46 is pressed in the setting screen G1 and it is determined that at least one change value V2 is an inappropriate value (hereinafter, referred to as "error state"), notify the user of the error state. Similarly to the setting screen G1, the error screen G2 is also displayed on the display section 18.

For notifying the error state in the setting screen G1, the error screen G2 corresponds to the setting screen G1. Thus, the error screen G2 in FIG. 3 includes the same setting items 52 and multiple setting fields 54 as those of the corresponding setting screen G1 in FIG. 2, and also includes a setting button 56, a cancel button 58, and a help button 60. In addition, the error screen G2 includes a warning display 62 indicating that it is in an error state.

In each setting field 54 of the error screen G2, the same set value V1 or change value V2 as that displayed in the setting field 44 of the setting screen G1 when the error screen G2 is displayed, is displayed so as to be changeable. Thus, the setting fields 54 of the error screen G2 include a setting field 54 in which an inappropriate change value V2 is displayed (a setting field 54B in FIG. 3). In the error screen G2, the setting item 52 corresponding to the setting field 54 in which the inappropriate change value V2 is displayed (the setting item 52B in FIG. 3) and the other setting items 52 (the setting items 52 corresponding to setting fields 54 in which set values V1 are displayed and setting fields 54 in which appropriate change values V2 are displayed) are displayed in different forms in color and font. It should be noted that the function of each button is the same as that in the setting screen G1, and the overlap description is omitted.

2. Setting Process

Figure 4:
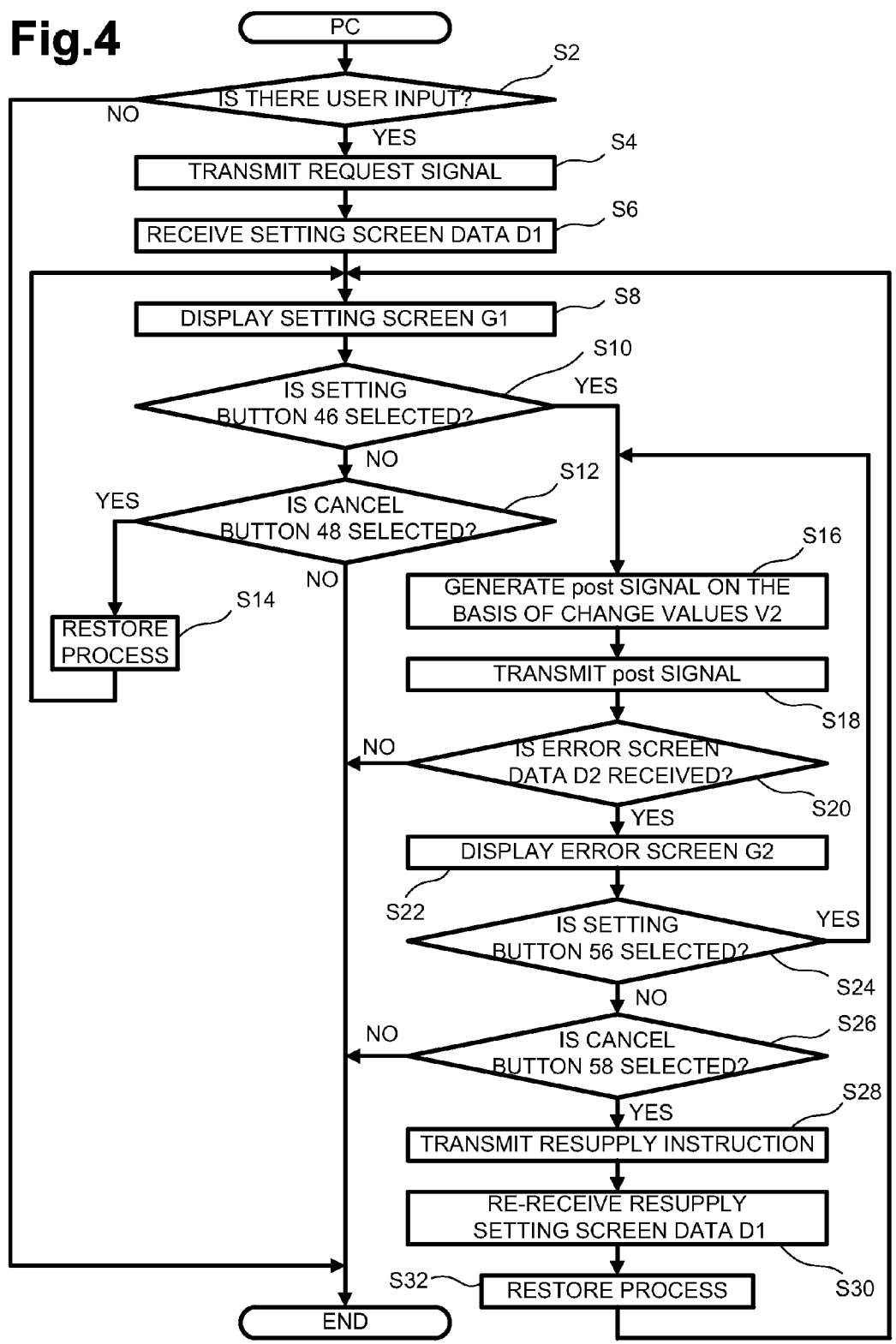
FIG. 4 is a flowchart illustrating a process in a PC according to Embodiment 1.
Figure 5:
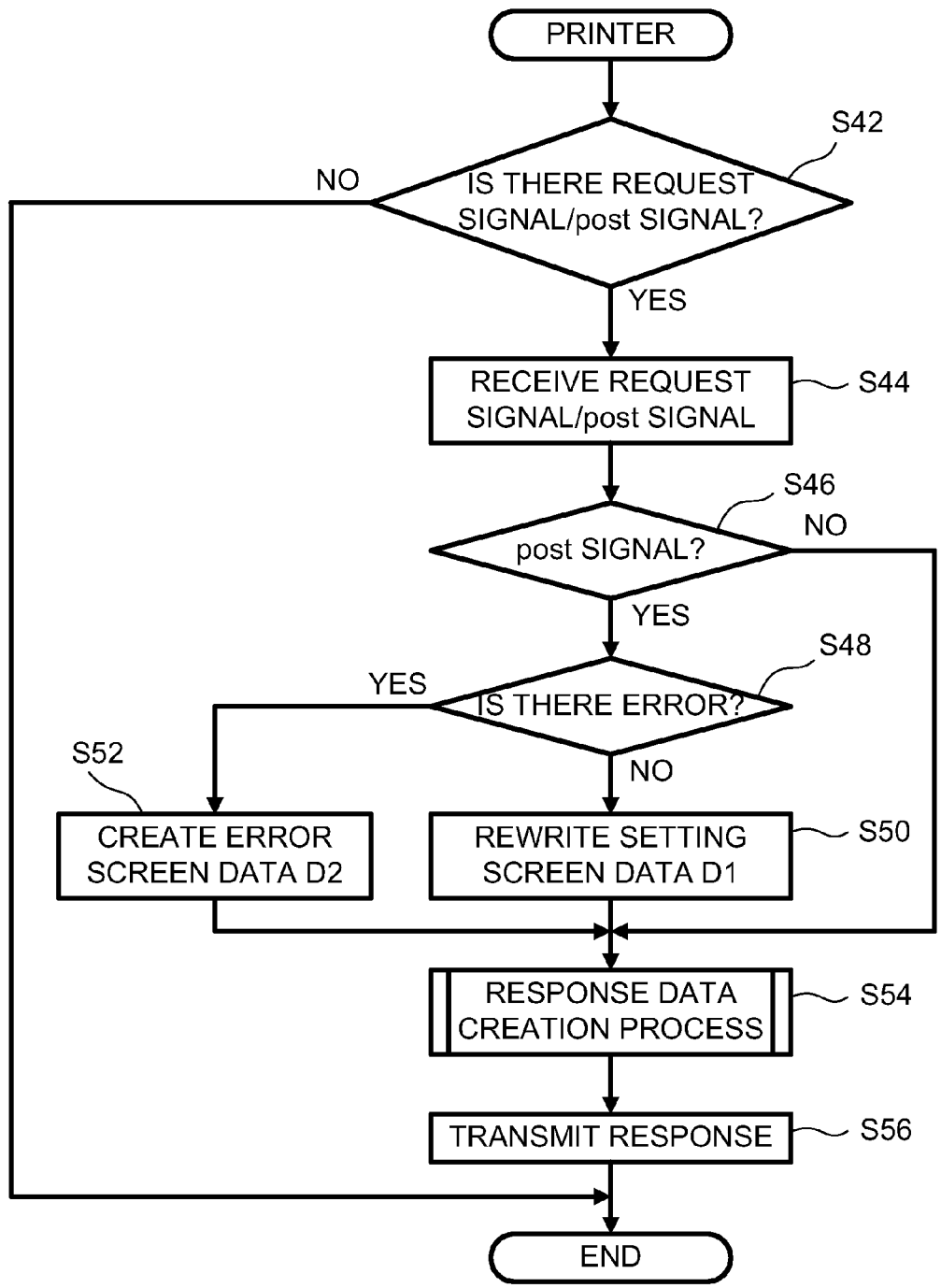
FIG. 5 is a flowchart illustrating a process in a printer according to Embodiment 1.
Figure 6:
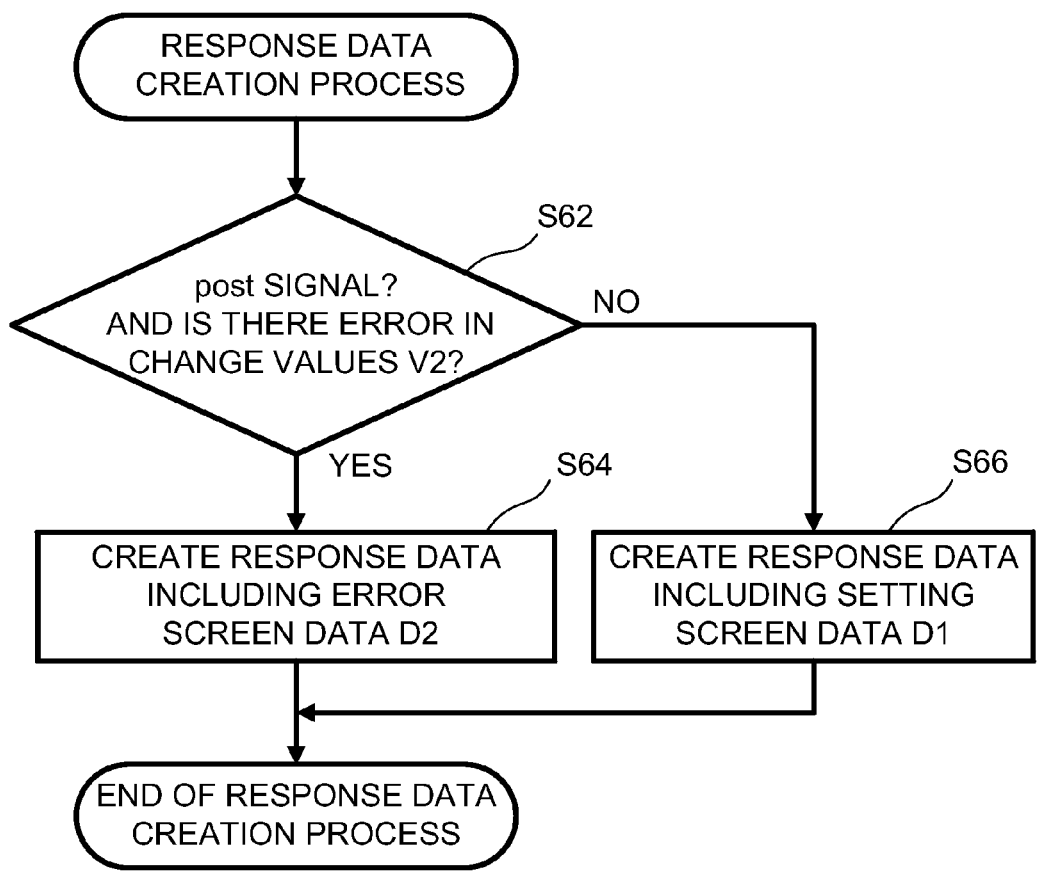
FIG. 6 is a flowchart illustrating a response data creation process according to Embodiment 1.
Figure 7:
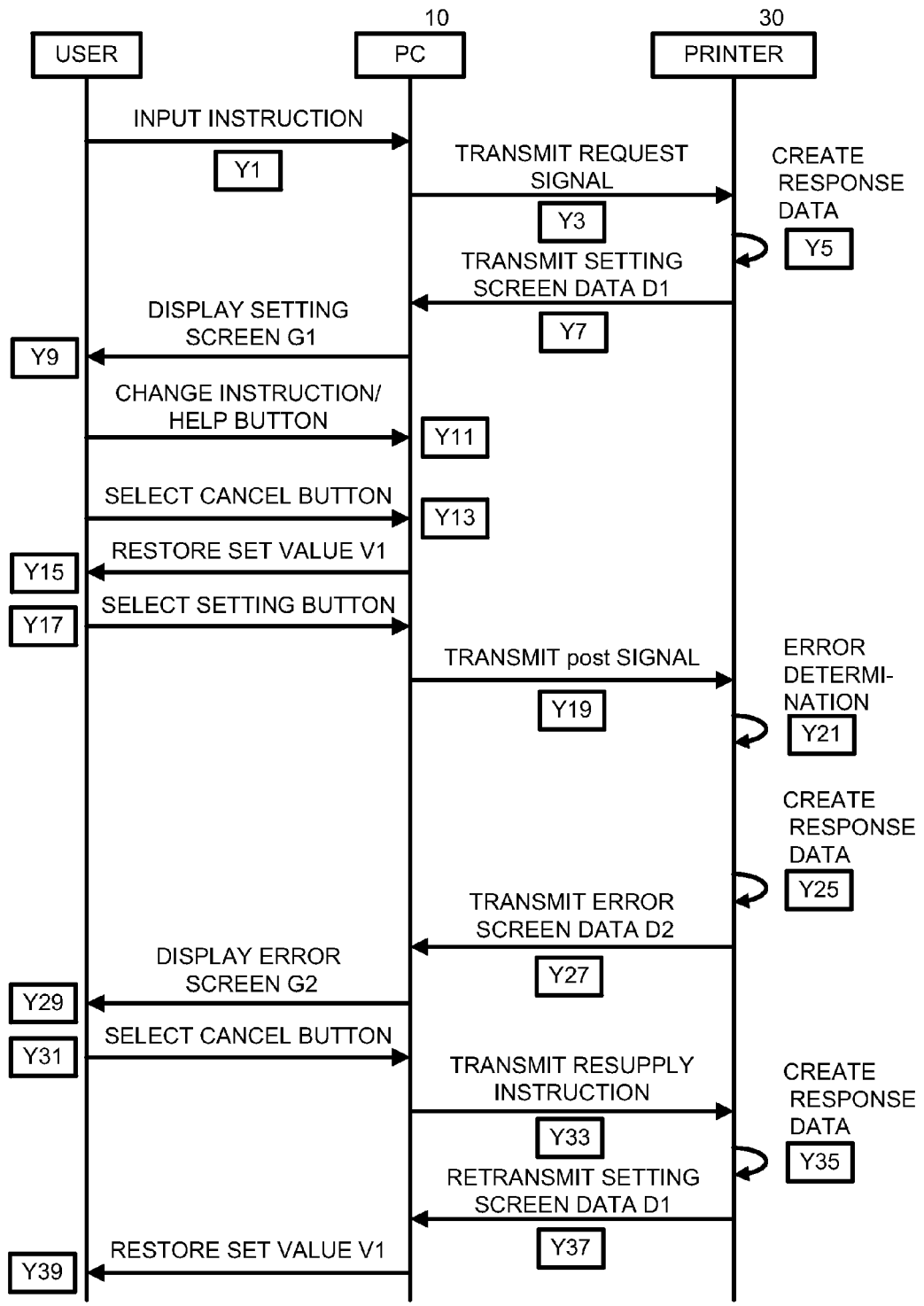
FIG. 7 is a diagram illustrating a time series of data transfer in changing a setting item of Embodiment 1.

Processes performed in the PC 10 and the printer 30 when the user selects the setting button 46 or 56 and the cancel button 48 or 58 in each screen G will be described with reference to FIGS. 4 to 7. FIGS. 4 to 6 illustrate flowcharts of the processes performed in the PC 10 and the printer 30, and FIG. 7 illustrates a situation where instructions, data, and the like are transferred in the processes.

(Process in PC)

First, a process of the CPU 12 of the PC 10 that operates in accordance with the web browser will be described.

As shown in FIG. 4, the CPU 12 waits for an instruction to display the setting screen G1 being inputted from the user via the operation section 16, for each specific period of time (S2), and ends the process when there is no input (S2: NO). On the other hand, when an input instruction is inputted from the user within the specific period of time (S2: YES, FIG. 7: Y1), the CPU 12 transmits a request signal to the printer 30 (S4, FIG. 7: Y3). When the CPU 12 receives the setting screen data D1 from the printer 30 on the basis of the transmission of the request signal (S6, FIG. 7: Y7), the CPU 12 stores the setting screen data D1 in the memory 14 and displays the setting screen G1 on the display section 18 (S8, FIG. 7: Y9).

In the printer 30, the setting screen data D1 including the set values V1 that are currently set in the printer 30 is stored. First, the CPU 12 that has received the setting screen data D1 displays, on the display section 18, the setting screen G1 in which the set values V1 are displayed in the setting fields 44.

After displaying the setting screen G1, the CPU 12 waits for various instructions being inputted from the user to the setting screen G1. When an instruction to change a set value V1 in a setting field 44 to a change value V2, to change a change value V2 to a different change value V2, or the like is inputted by the user (FIG. 7: Y11), the CPU 12 changes the display of the setting field 44 in accordance with the instruction. It should be noted that even when the above change instruction is inputted, the CPU 12 does not rewrite the setting screen data D1 stored in the memory 14.

When the help button 50 is selected by the user (FIG. 7: Y11), the CPU 12 displays the help information corresponding to each setting item 42.

When the cancel button 48 is selected in the setting screen G1 (S10: NO, S12: YES, FIG. 7: Y13), the CPU 12 performs a restore process for restoring the change value V2 displayed in the setting field 44 to the set value V1 (S14). In the memory 14, the setting screen data D1 including the set values V1 is stored. In the restore process (S14), by using the setting screen data D1 stored in the memory 14, the CPU 12 restores the change value V2 displayed in the setting field 44 to the set value V1 and displays the restored setting screen G1 on the display section 18 (S8, FIG. 7: Y15).

When the setting button 46 is selected in the setting screen G1 (S10: YES, FIG. 7: Y17), the CPU 12 generates a post signal (a supply instruction) on the basis of the change values V2 (S16). The CPU 12 transmits, to the printer 30, the post signal including a content that associates the change value V2 in the setting screen G1 displayed on the display section 18 with the setting item 42 corresponding to the setting field 44 in which the change value V2 is inputted (S18, FIG. 7: Y19). It should be noted that when the setting button 46 is selected (S10: YES), the CPU 12 may rewrite the set value V1 in the setting screen data D1 stored in the memory 14 to the change value V2. In this case, whether or not the CPU 12 rewrites the setting screen data D1 depends, for example, on the type of the web browser for displaying the setting screen G1.

When the CPU 12 does not receive the error screen data D2 on the basis of the transmission of the post signal (S20: NO), the CPU 12 determines that the rewritten setting screen data D1 is set in the printer 30, and ends the process.

On the other hand, when the CPU 12 receives the error screen data D2 on the basis of the transmission of the post signal (S20: YES, FIG. 7: Y27), the CPU 12 stores the error screen data D2 in the memory 14 and displays the error screen G2 on the display section 18 (S22, FIG. 7: Y29).

After displaying the error screen G2, the CPU 12 waits for various instructions being inputted from the user to the error screen G2. When an instruction to change a setting field 54 is inputted by the user, the CPU 12 changes the display of the setting field 54 in accordance with the instruction. It should be noted that even when the above change instruction is inputted, the CPU 12 does not rewrite the setting screen data D1 stored in the memory 14.

When the help button 60 is selected by the user, the CPU 12 displays the help information corresponding to each setting item 52.

When the cancel button 58 is selected in the error screen G2 (S24: NO, S26: YES, FIG. 7: Y31), the CPU 12 transmits a request signal for requesting resupply of the setting screen data D1 (a resupply instruction) to the printer 30 (S28, FIG. 7: Y33).

When the CPU 12 receives again the setting screen data D1 from the printer 30 on the basis of the transmission of the resupply instruction (S30, FIG. 7: Y37), the CPU 12 overwrites the setting screen data D1 stored in the memory 14 with this setting screen data D1, performs a restore process by using the overwritten setting screen data D1 (S32), and displays the restored setting screen G1 on the display section 18 (S8, FIG. 7: Y39). It should be noted that the restore process (S32) is the same as the above restore process (S14), and the overlap description is omitted.

When the setting button 56 is selected in the setting screen G1 (S24: YES), the CPU 12 returns to S16 to repeat the processes described above. Further, when an instruction to stop the process is inputted from the user in the setting screen G1 (S10: NO, S12: NO) or when an instruction to stop the process is inputted from the user in the error screen G2 (S24: NO, S26: NO), the CPU 12 ends the process.

(Process in Printer)

Next, a process of the CPU 32 of the printer 30 that operates in accordance with the programs P2 will be described.

As shown in FIG. 5, the CPU 32 waits for a request signal or a post signal being inputted from the PC 10, for each specific period of time (S42), and ends the process when there is no input (S42: NO). On the other hand, when the request signal or the post signal is inputted from the PC 10 within the specific period of time (S42: YES, FIG. 7: Y3, Y19, Y33), the CPU 32 receives the request signal or the post signal (S44) and confirms which signal the received signal is (S46). It should be noted that when receiving a post signal, the network interface 36 serves as a reception section.

When the received signal is a request signal (S46: NO), the CPU 32 shifts to a response data creation process of creating response data, e.g., screen data D, to be transmitted to the PC 10 (S54, FIG. 7: Y5, Y35). When the received signal is a post signal (S46: YES), the determination section 32A in the CPU 32 performs an error determination process on the setting screen data D1 included in the post signal (S48, FIG. 7: Y21).

In the error determination process, the determination section 32A determines whether or not the change values V2 associated with the setting items 44 included in the post signal are appropriate values. The determination is performed by comparing the change values V2 against the corresponding reference range data Dr. When all the change values V2 are appropriate values, the determination section 32A determines that there is no error (S48: NO). In this case, the first supply section 32BA in the CPU 32 rewrites the set values V1 stored in the memory 34 (i.e., currently set in the printer 30) to the change values V2 included in the post signal (S50). Then, the first supply section 32BA shifts to a response data creation process (S54, FIG. 7: Y25).

On the other hand, when at least one of the change values V2 is an inappropriate value, the determination section 32A determines that there is an error (S48: YES). In this case, the determination section 32A generates a supply instruction instructing the second supply section 32BB in the CPU 32 to generate error screen data D2 without rewriting the set values V1 stored in the memory 34 (S52). When the change values V2 include an inappropriate value, the second supply section 32BB generates error screen data D2 in which the color and/or the font of the setting item 52 corresponding to the setting field 54 in which this change value V2 is displayed are changed. After generating the error screen data D2, the second supply section 32BB shifts to the response data creation process (S54, FIG. 7: Y25).

As shown in FIG. 6, in the response data creation process, the CPU 32 confirms whether or not the received signal is a post signal, and if the received signal is a post signal, the CPU 32 confirms whether or not there is an error in the included change values V2 (S62). When the received signal is a post signal and there is an error in the included change values V2 (S62: YES), the second supply section 32BB creates response data including the error screen data D2 stored in the memory 34 (S64). On the other hand, when the received signal is not a post signal or when the received signal is a post signal but there is no error in the included change values V2 (S62: NO), the first supply section 32BA creates response data including the setting screen data D1 stored in the memory 34 (S66).

When creating the response data, the first supply section 32BA or the second supply section 32BB transmits the response data to the PC 10 (S56, FIG. 7: Y7, Y27, Y37) and ends the process.

When the CPU 32 receives a post signal, if the setting screen data D1 is rewritten prior to the response data creation process, the first supply section 32BA creates response data including the rewritten setting screen data D1, in the response data creation process.

On the other hand, when the CPU 32 receives a post signal, if the setting screen data D1 is not rewritten prior to the response data creation process, the second supply section 32BB creates, in the response data creation process, response data including the error screen data D2 that is created and stored in the memory 14 when the post signal is received.

Further, the setting screen data D1 stored in the memory 14 is not rewritten unless it is determined in the error determination process (S48) performed by the determination section 32A that there is no error. Thus, the setting screen data D1 that is transmitted to the PC 10 when the resupply instruction (request signal) is received is the same as the setting screen data D1 that is transmitted to the PC 10 when a previous request signal is received. Thus, as the setting screen data D1 that is transmitted to the PC 10 when the resupply instruction is received, the setting screen data D1 previously transmitted to the PC 10 is retransmitted.

3. Advantageous Effects of Embodiment (1) In the system using the printer 30 of the embodiment, when the cancel button 48 is selected in the setting screen G1, the setting button 46 has not been selected yet, and the supplied setting screen data D1 is stored in the memory 14 in the PC 10 without being rewritten. In this case, the set values V1 can quickly be restored by restoring the set values V1 using the setting screen data D1 already stored in the PC 10. In addition, when the cancel button 58 is selected in the error screen G2, the setting button 46 may already have been selected, and the supplied setting screen data D1 may have been rewritten in the PC 10. In this case, the set values V1 can accurately be restored by restoring the set values V1 using the supply setting screen data D1 resupplied to the PC 10.

(2) In the system using the printer 30 of the embodiment, when the cancel button 58 is selected in the error screen G2, the resupply instruction is transmitted to the printer 30. Then, when receiving the resupply instruction, the first supply section 32BA of the printer 30 supplies the supply setting screen data D1 to the PC 10. According to the system using the printer 30, the supply setting screen data D1 can be supplied at a time when it is necessary to supply the supply setting screen data D1 to the PC 10.

(3) In the system using the printer 30 of the embodiment, the setting items 42 corresponding to the setting fields 44 included in the setting screen G1 are the same as the setting items 52 corresponding to the setting fields 54 included in the error screen G2. According to the system using the printer 30, since the setting screen G1 and the error screen G2 includes the setting items corresponding to the common setting fields, it is easy to cause the user to recognize that the setting screen G1 and the error screen G2 are equivalent screens.

(4) In the system using the printer 30 of the embodiment, when supplying the error screen data D2 to the PC 10 via the network interface 36, the second supply section 32BB of the printer 30 supplies, to the PC 10, the error screen data D2 in which the setting item 52 corresponding to the setting field 54 of which the change value V2 is determined as an appropriate value and the setting item 52 corresponding to the setting field 54 of which the change value V2 is determined as an inappropriate value are in different forms in color and/or font and are configured to be identifiable from each other. According to the system using the printer 30, the user who views the error screen G2 can easily recognize the setting item 52 determined as being inappropriate.

Embodiment 2

Figure 8:
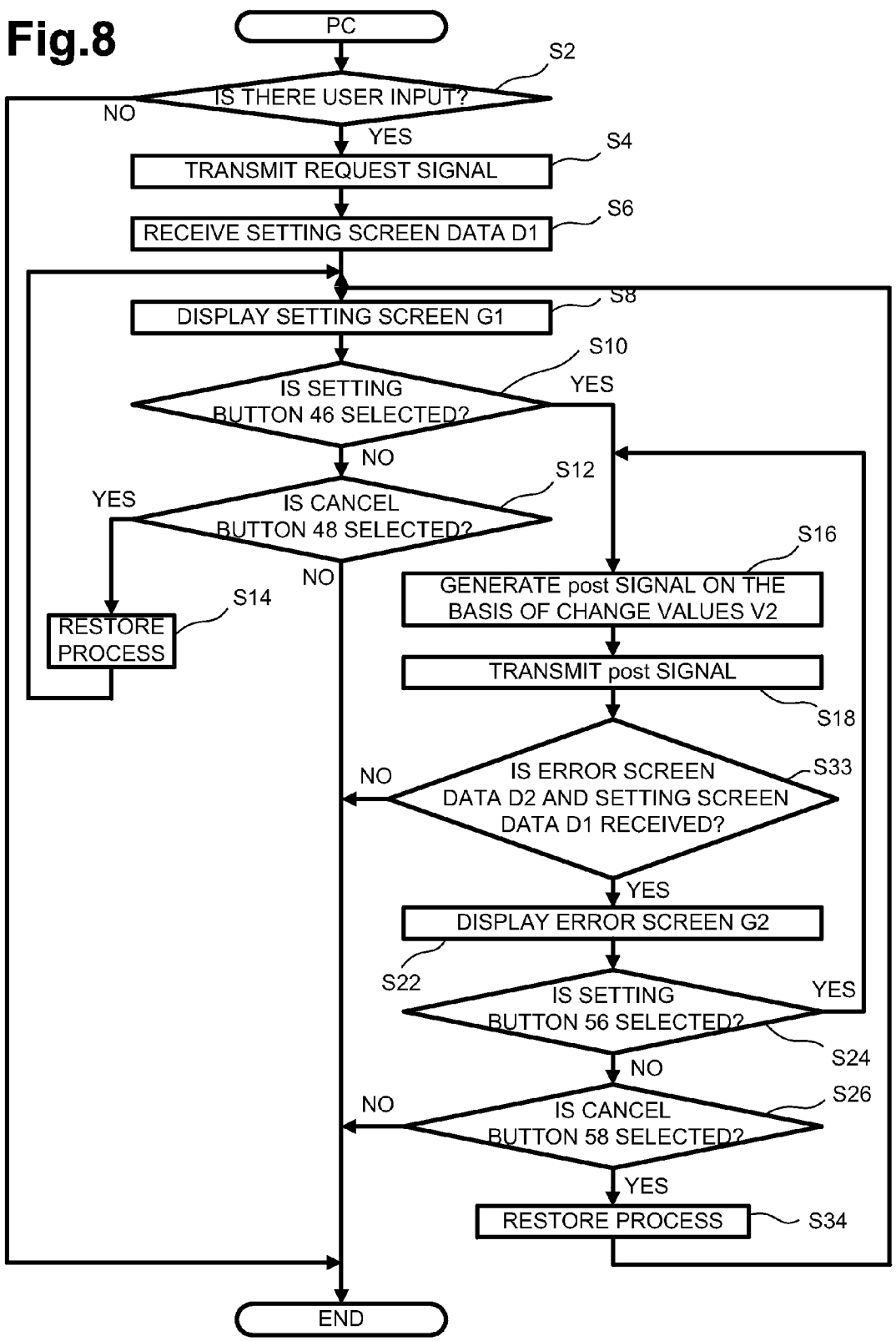
FIG. 8 is a flowchart illustrating a process in a PC according to Embodiment 2.

Embodiment 2 will be described with reference to FIGS. 8 to 10. As shown in FIGS. 8 and 10, a system of the embodiment differs from the system of Embodiment 1 in that after the error screen G2 is displayed, even when the cancel button 58 is selected, the resupply instruction for requesting resupply of the setting screen data D1 is not transmitted. In the following, the overlap description concerning the same contents as those in Embodiment 1 is omitted.

1. Setting Process (Process in Printer)

Figure 9:
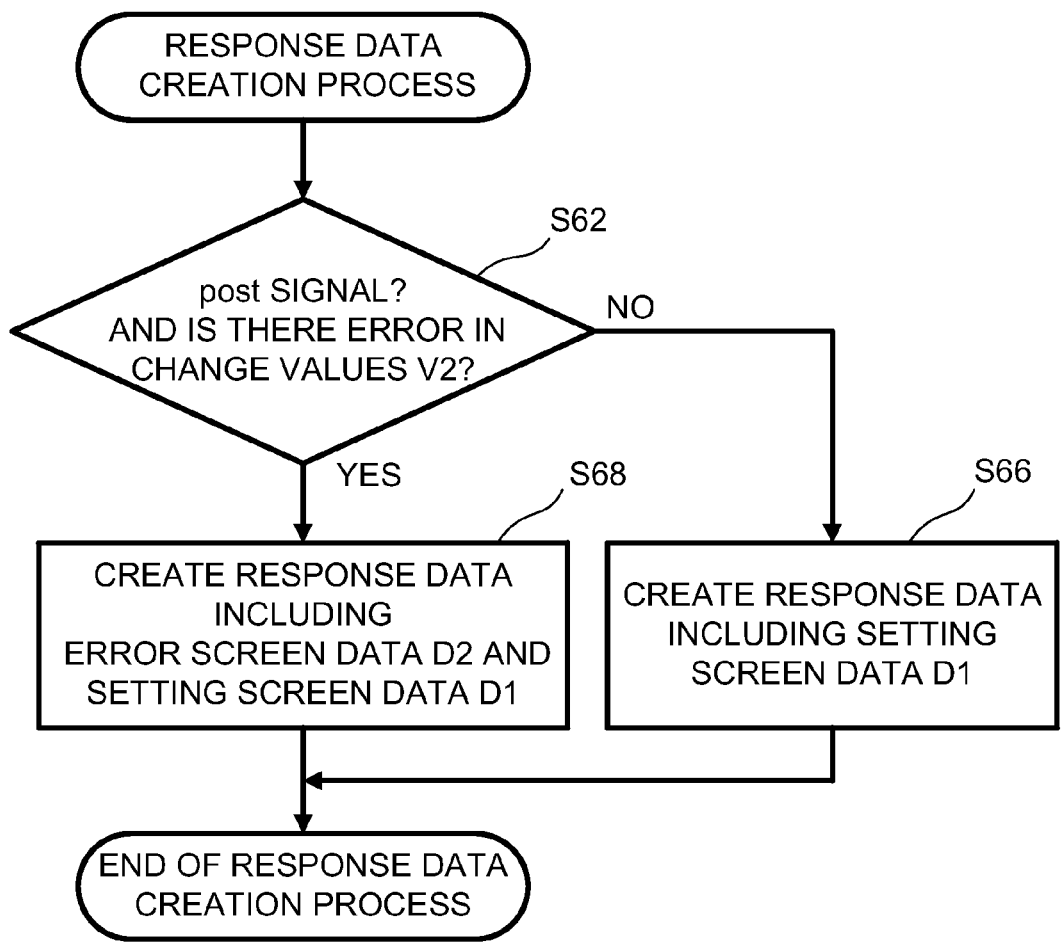
FIG. 9 is a flowchart illustrating a response data creation process according to Embodiment 2.
Figure 10:
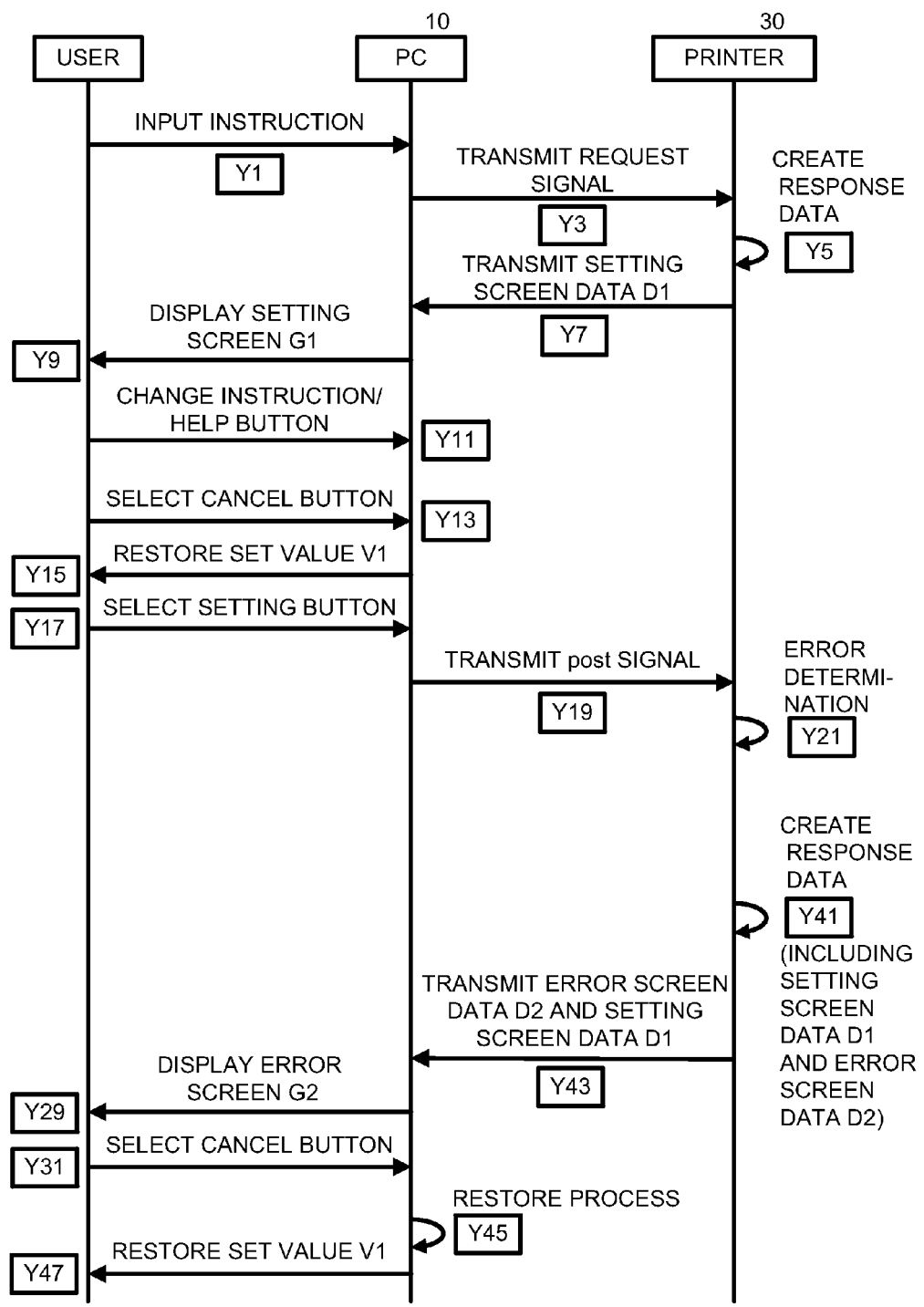
FIG. 10 is a diagram illustrating a time series of data transfer in changing a setting item of Embodiment 2.

As shown in FIG. 9, in the printer 30 of the embodiment, in the response data creation process, when a received signal is a post signal and there is an error in the change values V2 associated with the included setting items 44 (S62: YES), the second supply section 32BB creates response data including the setting screen data D1 and the error screen data D2 that are stored in the memory 34 (S68, FIG. 10: Y41).

(Process in PC)

As shown in FIG. 8, in the PC 10 of the embodiment, when the CPU 12 receives the error screen data D2 and the setting screen data D1 on the basis of transmission of a post signal (S33: YES, FIG. 10: Y43), the CPU 12 stores the error screen data D2 in the memory 14, overwrites the setting screen data D1 stored in the memory 14 with this setting screen data D1, and stores the overwritten setting screen data D1. The CPU 12 displays the error screen G2 on the display section 18 on the basis of the error screen data D2 stored in the memory 14 (S22, FIG. 10: Y29). On the other hand, the CPU 12 does not display the setting screen G1.

When the cancel button 58 is selected in the error screen G2 (S24: NO, S26: YES, FIG. 10: Y31), the CPU 12 performs a restore process (S34). In the restore process S34, the CPU 12 restores the change value V2 displayed in the setting field 44 to the set value V1 by using the error screen data D2 as well as the setting screen data D1 stored in the memory 14 (FIG. 10: Y45), and displays the restored setting screen G1 on the display section 18 (FIG. 10: Y47).

2. Advantageous Effects of the Embodiment (1) In the system using the printer 30 of the embodiment, the first supply section 32BA and the second supply section 32BB resupply the setting screen data D1 to the PC 10 with supply of the error screen data D2. According to the system using the printer 30, when it is necessary to resupply the setting screen data D1 to the PC 10, it is not necessary to wait for the resupply setting screen data D1 being supplied to the PC 10, and the set values V1 can be restored quickly.

Embodiment 3

Figure 11:
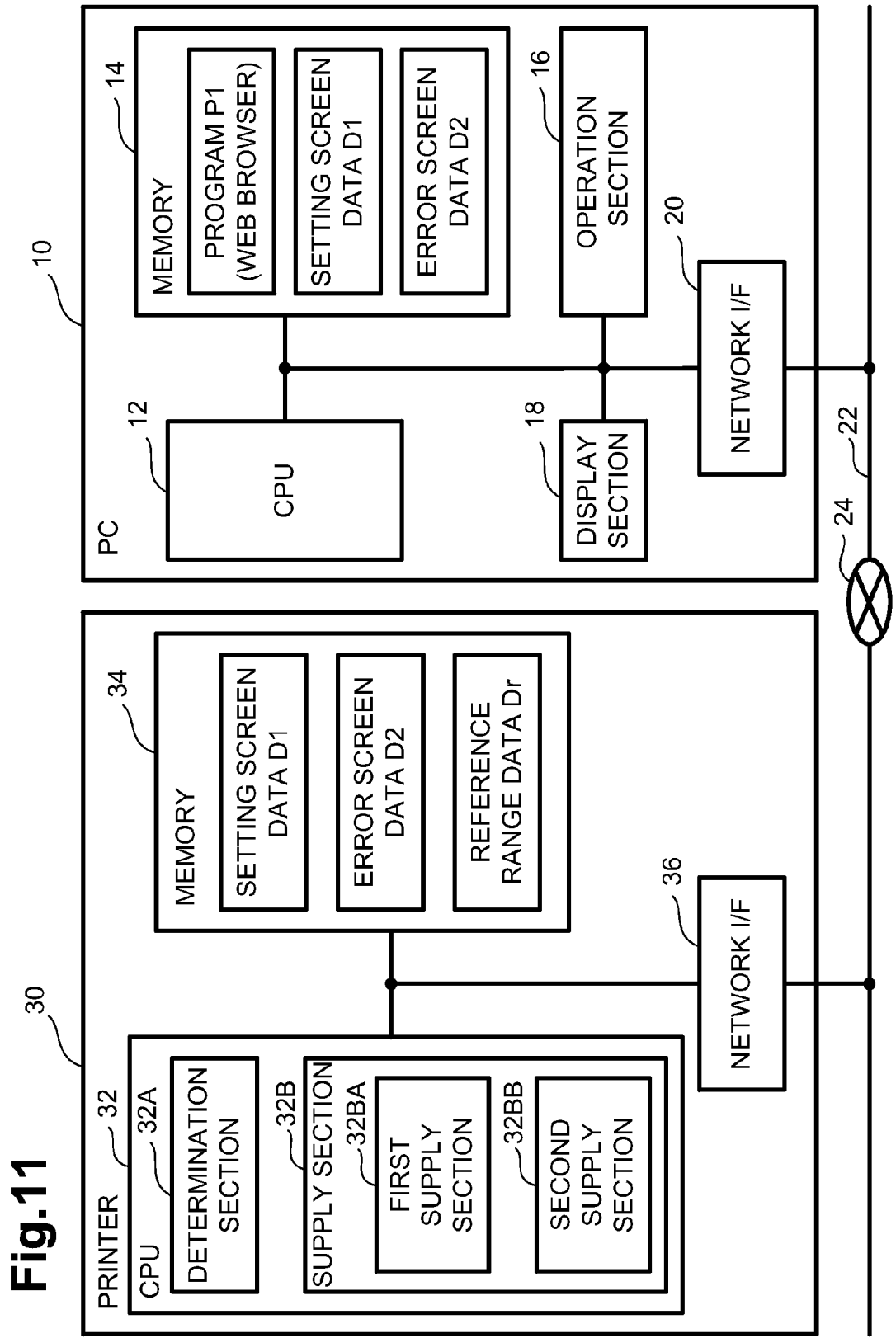
FIG. 11 is a block diagram illustrating a configuration of a system according to Embodiment 3.

Embodiment 3 will be described with reference to FIG. 11. As shown in FIG. 11, a system of the embodiment differs from the system of Embodiment 1 in that the PC 10 and the printer 30 are connected to an external network 24 such as the Internet via the communication line 22 and a router not shown, and thus the PC 10 and the printer 30 are connected to each other via the external network 24.

1. Configuration of System

In the memory 14 of the PC 10, a web browser is installed as a program P1. The memory 34 of the printer 30 serves as a memory of a web server. In addition, in the memory 34 of the printer 30, downloadable setting screen data D1 is stored so as to be associated with an URL (Uniform Resource Locator).

When a URL is inputted from the user (FIG. 4: S2: YES, FIG. 7: Y1), the CPU 12 of the PC 10 transmits a request signal to the printer 30 in accordance with the web browser (FIG. 4: S4, FIG. 7: Y3), and receives the setting screen data D1 associated with the inputted URL from the printer 30 (FIG. 4: S6, FIG. 7: Y7).

Further, in the memory 34 of the printer 30, the error screen data D2 corresponding to the setting screen data D1 is stored so as to be associated with the same URL as the URL associated with the setting screen data D1. Thus, when the error screen G2 is displayed on the basis of the setting button 46 in the setting screen G1 being selected, the PC 10 receives, from the printer 30, the error screen data D2 associated with the same URL as that with the setting screen data D1 corresponding to the setting screen G1. Other than being performed via the URL, the process of the embodiment is the same as that of Embodiment 1, and thus the overlap description is omitted.

2. Advantageous Effects of Embodiment (1) In the printer 30 of the embodiment, the printer 30 is connected to the PC 10 via the external network 24, and the setting screen data D1 and the error screen data D2 are stored in the memory 34 so as to be associated with the same URL. According to the printer 30, since the URL indicating the setting screen data D1 and the URL indicating the error screen data D2 are the same, the user can be caused to recognize that the setting screen G1 and the error screen G2 are equivalent screens.

Other Embodiments

The present invention is not limited to the embodiments disclosed in the above description and the drawings, and, for example, the following embodiments are also included within the technical scope of the present invention.

(1) In the embodiments described above, the printer 30 is used as a device connected to the PC 10 that is a terminal device. The "device" of the present invention is not limited to the printer 30. The technique is applicable, for example, to all devices that require change of the setting item 42 using the setting screen G1 with the PC 10, such as routers, TVs, facsimile machines, and multi function devices.

(2) In the embodiments described above, the example where the determination section 32A of the printer 30 determines whether or not the change values V2 are appropriate is described. Alternatively, the CPU 12 of the PC 10 may perform the determination. In this case, the CPU 32 of the printer 30 needs to transmit the reference range data Dr stored in the memory 34 of the printer 30 to the PC 10 prior to the CPU 12 of the PC 10 determining whether or not the change values V2 are appropriate, and a process of transmitting a result of the determination by the CPU 12 to the CPU 32 of the printer 30 is also needed.

(3) In the embodiments described above, the setting screen G1 for setting the setting items concerning communication of the printer 30 is used. The "setting item" of the present invention is not limited to ones concerning communication. The technique is also applicable, for example, to print settings such as the number of sheets to be printed and a print range, as long as the device to which the present invention is applied is the printer 30.

(4) In the embodiments described above, the change value V2 is merely defined as an appropriate value or an inappropriate value. Specifically, a value that is settable as the change value V2 is defined as an appropriate value, and a value that is not settable as the change value V2 is defined as an inappropriate value. Alternatively, a value that is settable to the printer 30 but with which the printer 30 does not properly operate may be defined as an inappropriate value.

What is claimed is:

1. A communication system comprising:
a terminal device; and
a peripheral device configured to be connected to the terminal device via a LAN;
the terminal device comprising:
a first transmitting unit configured to transmit a request signal to the peripheral device via the LAN;
a first receiving unit configured to receive setting screen data from the peripheral device via the LAN after the first transmitting unit transmits the request signal;
a first displaying unit configured to display a setting screen using the setting screen data in accordance with a web browser, the setting screen including a first set value field, a setting button, and a first cancel button, the first set value field displaying a first value so as to be changeable, the first value being currently set in a setting item of the peripheral device;
a first screen controlling unit configured to display the first value in the first set value field by using the setting screen data already received from the peripheral device by the first receiving unit without receiving the setting screen data again so as to replace a second value with the first value, in a case where the first cancel button is selected in the terminal device while the second value is displayed in the first set value field instead of the first value;
a second transmitting unit configured to transmit a post signal including the second value to the peripheral device via the LAN in a case where the setting button is selected in the terminal device while the second value is displayed in the first set value field instead of the first value;
a second receiving unit configured to receive error screen data from the peripheral device via the LAN after the second transmitting unit transmits the post signal;
a second displaying unit configured to display an error screen using the error screen data in accordance with the web browser, the error screen including a second set value field and a second cancel button, the second set value field displaying the second value included in the post signal;
a third transmitting unit configured to transmit a resupplying instruction to the peripheral device via the LAN, in a case where the second cancel button is selected in the terminal device while the second value is displayed in the second set value field;
a third receiving unit configured to receive the setting screen data from the peripheral device again via the LAN after the third transmitting unit transmits the resupplying instruction, the setting screen data displaying the setting screen that includes the first set value field, the setting button, and the first cancel button, the first set value field displaying the first value so as to be changeable, the first value being currently set in the setting item of the peripheral device; and
a second screen controlling unit configured to display the first value in the first set value field by using the setting screen data received again by the third receiving unit so as to replace the second value with the first value, when the third receiving unit receives the setting screen data again;
the peripheral device comprising:
a processor, when executing computer readable instructions stored on a memory of the peripheral device, configured to provide:
a first receiving section configured to receive the request signal from the terminal device via the LAN;
a first creating section configured to create the setting screen data in response to the receiving of the request signal from the terminal device;

a first supply section configured to supply the setting screen data to the terminal device via the LAN after the first creating section creates the setting screen data;

a second receiving section configured to receive the post signal from the terminal device via the LAN after the first supply section supplies the setting screen data;

a determination section configured to determine, in response to the receiving of the post signal from the terminal device, whether the second value included in the received post signal is an appropriate value;

a second creating section configured to create the error screen data when the determination section determines that the second value is an inappropriate value;

a second supply section configured to supply the error screen data to the terminal device via the LAN after the second creating section creates the error screen data;

a third receiving section configured to receive the resupplying instruction from the terminal device via the LAN after the second supply section supplies the error screen data;

a resupplying section configured to resupply the setting screen data to the terminal device again via the LAN when the third receiving section receives the resupplying instruction; and a setting section configured to set the second value in the peripheral device when the determination section determines that the second value is the appropriate value.

2. A terminal device configured to be connected to a peripheral device, the terminal device comprising:

a first transmitting unit configured to transmit a first signal to the peripheral device;

a first receiving unit configured to receive setting screen data from the peripheral device after the first transmitting unit transmits the first signal;

a first displaying unit configured to display a setting screen using the setting screen data, the setting screen including a first set value field, a setting button, and a first cancel button, the first set value field displaying a first value so as to be changeable, the first value being currently set in a setting item of the peripheral device;

a first screen controlling unit configured to display the first value in the first set value field by using the setting screen data already received from the peripheral device by the first receiving unit without receiving the setting screen data again so as to replace a second value with the first value, in a case where the first cancel button is selected in the terminal device while the second value is displayed in the first set value field instead of the first value;

a second transmitting unit configured to transmit a second signal including the second value to the peripheral device in a case where the setting button is selected in the terminal device while the second value is displayed in the first set value field instead of the first value;

a second receiving unit configured to receive error screen data from the peripheral device after the second transmitting unit transmits the second signal;

a second displaying unit configured to display an error screen using the error screen data, the error screen including a second set value field and a second cancel button, the second set value field displaying the second value included in the second signal;

a third transmitting unit configured to transmit a resupplying instruction to the peripheral device, in a case where the second cancel button is selected in the terminal device while the second value is displayed in the second set value field;

a third receiving unit configured to receive the setting screen data from the peripheral device again after the third transmitting unit transmits the resupplying instruction, the setting screen data displaying the setting screen that includes the first set value field, the setting button, and the first cancel button, the first set value field displaying the first value so as to be changeable, the first value being currently set in the setting item of the peripheral device; and a second screen controlling unit configured to display the first value in the first set value field by using the setting screen data received again by the third receiving unit so as to replace the second value with the first value, when the third receiving unit receives the setting screen data again.

3. The terminal device as in claim 2, wherein the first set value field and the second set value field are set value fields in which a common setting item is displayed.

4. A peripheral device configured to be connected to a terminal device, the peripheral device comprising:

a processor, when executing computer readable instructions stored on a memory, configured to provide:

a first receiving section configured to receive a first signal from the terminal device;

a first creating section configured to create setting screen data in response to the receiving of the first signal from the terminal device, the setting screen data causing the terminal device to display a setting screen that includes a first set value field, a setting button, and a first cancel button, the first set value field displaying a first value so as to be changeable, the first value being currently set in a setting item of the peripheral device, the setting button causing the terminal device to transmit a second signal including a second value to the peripheral device in a case where the setting button is selected in the terminal device while the second value is displayed in the first set value field instead of the first value, the first cancel button causing the terminal device to display the first value in the first set value field by using the setting screen data already supplied to the terminal device by the first supply section without supplying the setting screen data again so as to replace the second value with the first value, in a case where the first cancel button is selected in the terminal device while the second value is displayed in the first set value field instead of the first value;

a first supply section configured to supply the setting screen data to the terminal device after the first creating section creates the setting screen data;

a second receiving section configured to receive the second signal from the terminal device after the first supply section supplies the setting screen data;

a determination section configured to determine, in response to the receiving of the second signal from the terminal device, whether the second value included in the received second signal is an appropriate value;

a second creating section configured to create error screen data when the determination section determines that the second value is an inappropriate value, the error screen data causing the terminal device to display an error screen that includes a second set value field and a second cancel button, the second set value field displaying the second value included in the second signal, the second cancel button causing the terminal device to transmit a resupplying instruction to the peripheral device;

a second supply section configured to supply the error screen data to the terminal device after the second creating section creates the error screen data;

a third receiving section configured to receive the resupplying instruction from the terminal device after the second supply section supplies the error screen data;

a resupplying section configured to resupply the setting screen data to the terminal device again when the third receiving section receives the resupplying instruction, the setting screen data causing the terminal device to display the setting screen that includes the first set value field, the setting button, and the first cancel button, the first set value field displaying the first value so as to be changeable, the first value being currently set in the setting item of the peripheral device;

a setting section configured to set the second value in the peripheral device when the determination section determines that the second value is the appropriate value; and wherein the second cancel button causes the terminal device to display the first value in the first set value field by using the setting screen data supplied to the terminal device again by the resupplying section so as to replace the second value with the first value.

5. The peripheral device as in claim 4, wherein the first set value field and the second set value field are set value fields in which a common setting item is displayed.

6. The peripheral device as in claim 4, wherein the determination section is further configured to provide a supply instruction to the second supplying section when the second value is determined to be an inappropriate value.

7. The peripheral device as in claim 6, wherein:

in each of the first set value field and the second set value field, a plurality of setting items are displayed, when the supply instruction is received by the second supply section after it is determined the second value in a part of the plurality of setting items is an inappropriate value, the second supply section supplies the error screen data to the terminal device, and the second supply section supplies, to the terminal device, the error screen data in which the second value in a part of the plurality of setting items determined as an appropriate value and the second value in the part of the plurality of setting items determined as an inappropriate value, are configured to be identifiable from each other.

* * * * *